(12) United States Patent
Cho (10) Patent No.: US 9,880,413 B2
(45) Date of Patent: Jan. 30, 2018

(54) DISPLAY DEVICE (71) Applicant: Samsung Display Co., Ltd., Yongin-si (KR)

(72) Inventor: Young Min Cho, Seongnam-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 140 days.

(21) Appl. No.: 14/666,769

(22) Filed: Mar. 24, 2015

(65) Prior Publication Data

US 2016/0062182 A1  Mar. 3, 2016

(30) Foreign Application Priority Data

Sep. 3, 2014  (KR) .................. 10-2014-0116991

(51) Int. Cl.
G02F 1/133  (2006.01)
G02F 1/1335  (2006.01)
G02F 1/1339  (2006.01)

(52) U.S. Cl.
CPC ...... *G02F 1/133528* (2013.01); *G02F 1/1339* (2013.01)

(58) Field of Classification Search
CPC .............. G02B 21/368; G02B 1/08; G02B 5/30–5/3091; G02F 1/1335–1/133567; G02F 2001/133507–2001/133567
See application file for complete search history.

(56) References Cited

U.S. PATENT DOCUMENTS

| | | | | |
|---|---|---|---|---|
| 4,695,490 A | * | 9/1987 | McClelland | C08G 59/502 349/154 |
| 5,610,742 A | * | 3/1997 | Hinata | G02F 1/1333 349/122 |
| 2003/0112403 A1 | * | 6/2003 | Ino | G02F 1/13452 349/152 |
| 2004/0141110 A1 | | 7/2004 | Yu et al. | |
| 2005/0280751 A1 | | 12/2005 | Kim et al. | |
| 2007/0030420 A1 | * | 2/2007 | Jang | G02F 1/133528 349/96 |
| 2008/0068529 A1 | * | 3/2008 | Tebbit | G02F 1/133308 349/58 |
| 2008/0252824 A1 | * | 10/2008 | Kadowaki | G02B 5/3016 349/96 |
| 2011/0114954 A1 | | 5/2011 | Lee et al. | |
| 2012/0314162 A1 | * | 12/2012 | Ino | G02F 1/133308 349/96 |
| 2013/0236680 A1 | * | 9/2013 | Ahn | G02F 1/133308 428/68 |
| 2013/0293804 A1 | | 11/2013 | Kim | |

(Continued)

FOREIGN PATENT DOCUMENTS

| | | |
|---|---|---|
| KR | 1020110055251 | 6/2011 |
| KR | 1020130122884 | 11/2013 |
| KR | 1020140005404 | 1/2014 |

*Primary Examiner* — Bumsuk Won
*Assistant Examiner* — Jeffrey Madonna
(74) *Attorney, Agent, or Firm* — Cantor Colburn LLP (57) ABSTRACT A display device may include a first substrate having a display area and a non-display area, a second substrate opposite the first substrate, a light shielding sealant on at least one side surface of the first and second substrates, and a first polarizer on at least one surface of the first and second substrates. The first polarizer may intersect an imaginary surface extending from the at least one side surface.

12 Claims, 9 Drawing Sheets

(56) References Cited

U.S. PATENT DOCUMENTS

2014/0204293 A1* 7/2014 Kim .................. G02F 1/133351
349/15
2015/0124186 A1* 5/2015 Park .................. G02F 1/133528
349/40

* cited by examiner

DISPLAY DEVICE

This application claims priority to Korean Patent Application No. 10-2014-0116991, filed on Sep. 3, 2014, and all the benefits accruing therefrom under 35 U.S.C. §119, the content of which is incorporated herein in its entirety by reference.

BACKGROUND

1. Field

Exemplary embodiments of the invention relate to a display device, in which light leakage from a side of a display panel thereof is substantially minimized.

2. Description of the Related Art

A liquid crystal display ("LCD") is one of most widely used types of flat panel display ("FPD"). The LCD typically includes two substrates, on which an electric field generating electrode such as a pixel electrode and a common electrode is disposed, and a liquid crystal layer interposed between the two substrates. In the LCD, a voltage is applied to the electric field generating electrode so that liquid crystal molecules of the liquid crystal layer are rearranged, thereby adjusting the amount of light transmitted therethrough.

Such an LCD generally includes a display panel and a backlight unit that provides the display panel with light.

The display panel may include an upper substrate and a lower substrate that are bonded to each other with a liquid crystal layer interposed therebetween.

When the backlight unit provides the display panel with light, light leakage may occur in a side of the display panel, and thus light shielding sealants are typically applied to the side of the display panel.

SUMMARY

In a conventional display panel, light shielding sealants typically have a non-uniform thickness, that is, the light shielding sealants may have a large thickness in a middle part thereof and a small thickness in two end parts thereof. Accordingly, light leakage may still occur at the two end parts having the smaller thickness than the middle part.

One or more exemplary embodiment of the invention is directed to a display device in which light leakage from a side of a display panel is substantially minimized or effectively prevented.

According to an exemplary embodiment of the invention, a display device includes a first substrate having a display area and a non-display area, a second substrate opposite the first substrate, a light shielding sealant on at least one side surface of the first and second substrates, and a first polarizer on at least one surface of the first and second substrates. The first polarizer may intersect (or cross) an imaginary surface extending from the at least one side surface.

In an exemplary embodiment, the light shielding sealant may be in contact with at least one of a side surface and a lower surface of the first polarizer.

In an exemplary embodiment, a distance between an end portion of the first polarizer and the side surface may be in a range of about 1 micrometer (μm) to about 500 μm.

In an exemplary embodiment, the display device may further include a second polarizer on another surface of the first and second substrates.

In an exemplary embodiment, second polarizer may intersect (or cross) an imaginary surface extending from the at least one side surface.

In an exemplary embodiment, the light shielding sealant may be in contact with at least one of a side surface and a lower surface of the second polarizer.

In an exemplary embodiment, a distance between an end portion of the second polarizer and the side surface may be in a range of about 1 μm to about 500 μm.

In an exemplary embodiment, end portions of the first and second polarizers may be disposed on the substantially same surface.

According to one or more exemplary embodiment of the invention, a display device includes a polarizer that protrudes out further than a substrate. Therefore, when a light shielding sealant is applied, an edge portion of the light shielding sealant may be placed on a protrusion of the polarizer. Accordingly, it is possible to minimize light leakage from the edge portion of the light shielding sealant.

BRIEF DESCRIPTION OF THE DRAWINGS

The above and other features of the invention will be more clearly understood from the following detailed description taken in conjunction with the accompanying drawings, in which.

DETAILED DESCRIPTION

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present.

The spatially relative terms "lower," "upper," and the like, may be used herein for ease of description to describe the relations between one element or component and another element or component as illustrated in the drawings. It will be understood that the spatially relative terms are intended to encompass different orientations of the device in use or operation, in addition to the orientation depicted in the drawings. For example, in the case where a device shown in the drawing is turned over, the device positioned "lower" another device may be placed "upper" another device. Accordingly, the illustrative term "lower" may include both the lower and upper positions. The device may also be oriented in the other direction, and thus the spatially relative terms may be interpreted differently depending on the orientations.

Throughout the specification, when an element is referred to as being "connected" to another element, the element is "directly connected" to the other element, or "electrically connected" to the other element with one or more intervening elements interposed therebetween. It will be further understood that the terms "comprises," "comprising," "includes" and/or "including," when used in this specification, specify the presence of stated features, integers, steps, operations, elements, and/or components, but do not preclude the presence or addition of one or more other features, integers, steps, operations, elements, components, and/or groups thereof.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items.

It will be understood that, although the terms "first," "second," "third," and the like may be used herein to describe various elements, these elements should not be limited by these terms. These terms are only used to distinguish one element from another element. Thus, "a first element" discussed below could be termed "a second element" or "a third element," and "a second element" and "a third element" can be termed likewise without departing from the teachings herein.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms used herein (including technical and scientific terms) have the same meaning as commonly understood by those skilled in the art to which this invention pertains. It will be further understood that terms, such as those defined in commonly used dictionaries, should be interpreted as having a meaning that is consistent with their meaning in the context of the relevant art and will not be interpreted in an ideal or excessively formal sense unless clearly defined in the present specification.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, an exemplary embodiment of a display device according to the invention will be fully described with reference to FIGS. 1 to 8. The names of elements used in the description hereinafter may be selected in consideration of ease of description of a specification and may be different from the names of the components of the actual product.

Figure 1:
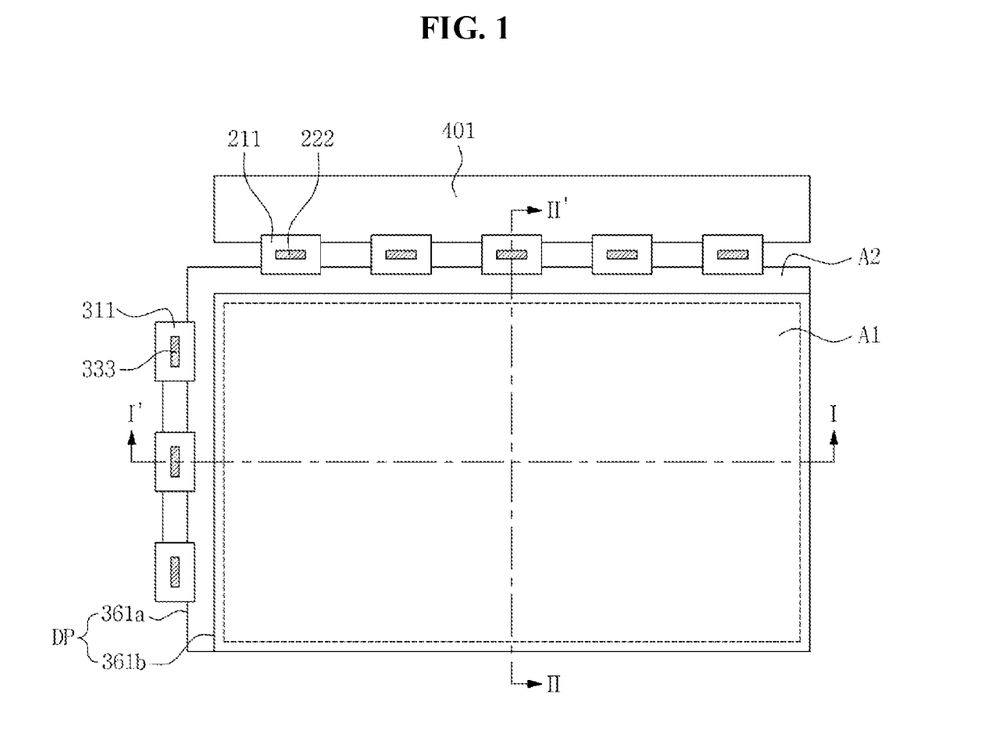
FIG. 1 is a diagram illustrating an exemplary embodiment of a display device according to the invention.
Figure 2:
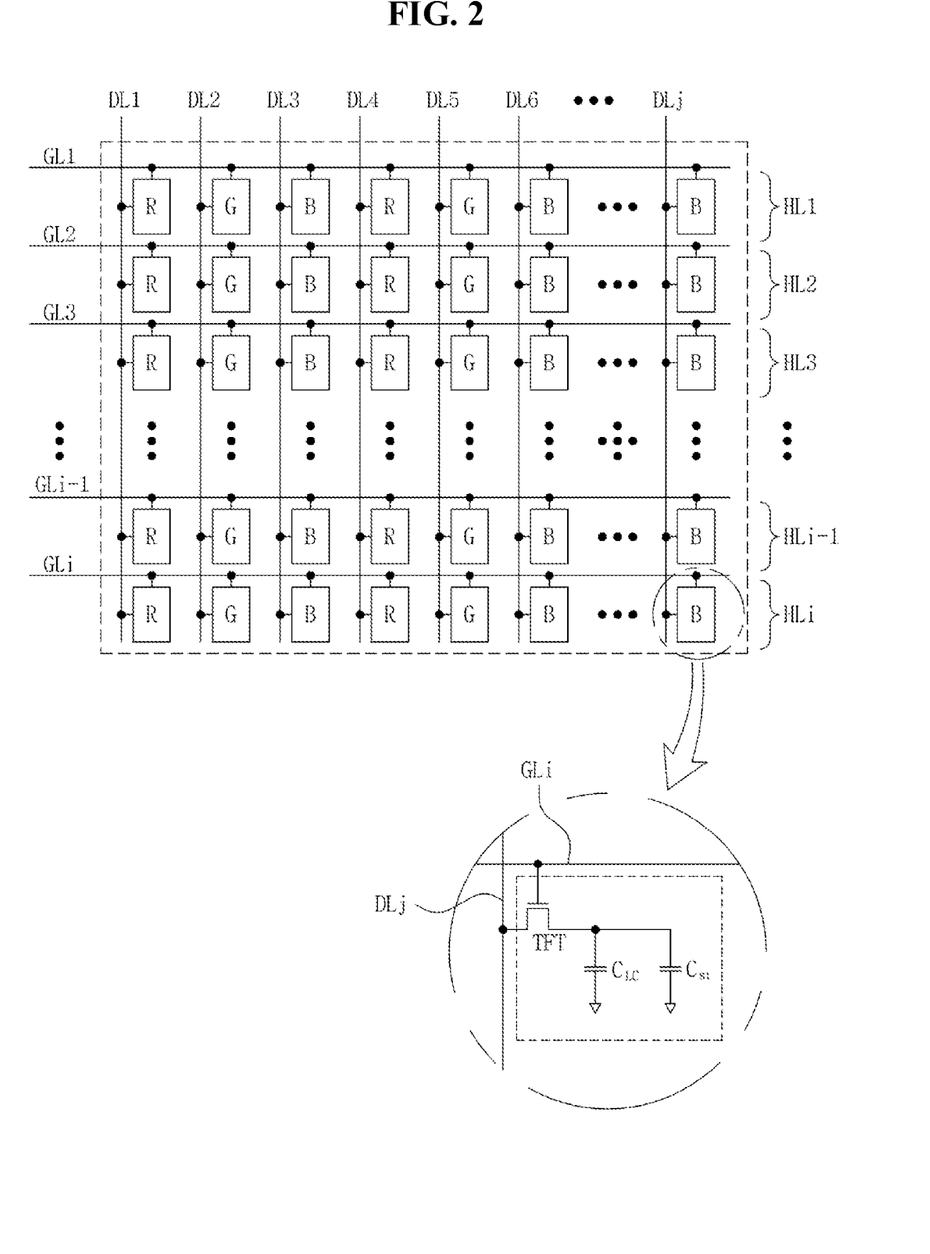
FIG. 2 is a diagram illustrating an array of pixels in a display area shown in FIG. 1.
Figure 3:
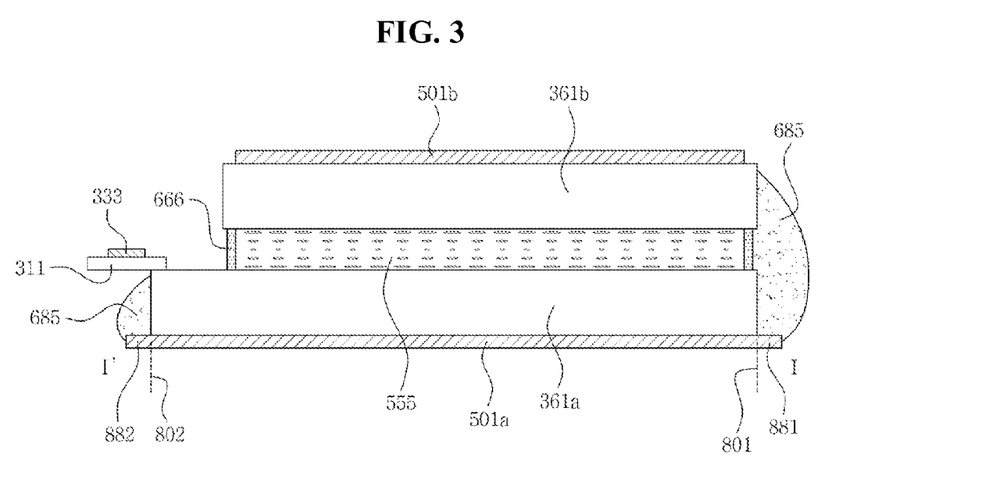
FIG. 3 is a cross-sectional view taken along line I-I' of FIG. 1 showing an exemplary embodiment of the display device shown in FIG. 1.

FIG. 1 is a diagram illustrating an exemplary embodiment of a display device according to the invention. FIG. 2 is a diagram illustrating an array of pixels in a display area shown in FIG. 1. FIG. 3 is a cross-sectional view taken along line I-I' of FIG. 1 showing an exemplary embodiment of the display device shown in FIG. 1.

As illustrated in FIGS. 1 to 3, an exemplary embodiment of a display device include a display panel DP. The display panel may include a lower substrate 361a and an upper substrate 361b that oppose (or is disposed opposite to) each other with a liquid crystal layer 555 interposed therebetween.

The respective lower and upper substrates 361a and 361b may have a plurality of surfaces. For ease of description, the plurality of surfaces may be defined as the following terms. Respective surfaces that face each other with the liquid crystal layer 555 interposed therebetween are defined as front surfaces of the corresponding substrates, surfaces opposite the front surfaces are defined as rear surfaces of the corresponding substrates, and surfaces that are between edges (or corners) of the front and rear surfaces of the corresponding substrates are defined as side surfaces.

In an exemplary embodiment, as illustrated in FIG. 1, the lower substrate 361a may be partitioned into two areas: a display area A1 and a non-display area A2. As illustrated in FIG. 2, a plurality of gate lines (GL1 to GLi), a plurality of data lines (DL1 to DLj) intersecting (or crossing) the plurality of gate lines (GL1 to GLi), and a plurality of thin film transistors (TFT) connected to the plurality of gate lines (GL1 to GLi) and the plurality of data lines (DL1 to DLj) may be disposed in the display area A1 of the front surface of the lower substrate 361a. Herein, i and j are natural numbers.

As illustrated in FIG. 3, the upper substrate 361b may be disposed opposite to the lower substrate 361a. An area of the upper substrate 361b may be large enough to cover at least the entire display area A1 of the lower substrate 361a.

Although not illustrated, a black matrix, a plurality of color filters, and a common electrode may be disposed on the front surface of the upper substrate 361b.

The black matrix may be disposed to overlap portions of the front surface of the upper substrate 361b except for parts corresponding to pixel areas of the front surface.

The color filters may be disposed in the pixel areas. The color filters may include a red color filter, a green color filter and a blue color filter.

A sealant 666 may be disposed along an edge portion of the front surface of the upper substrate 361b. The lower and upper substrates 361a and 361b may be bonded to each other by the sealant. The sealant may also seal a space between the lower and upper substrates 361a and 361b.

Pixels (R, G and B) may be arranged substantially in a matrix form in the display area A1. The pixels (R, G and B) may include a plurality of red pixels (R) disposed corresponding to the red color filter; a plurality of green pixels (G) disposed corresponding to the green color filter; and a plurality of blue pixels (B) disposed corresponding to the blue color filter. The red, green and blue pixels (R, G, and B), which are adjacent to each other in a horizontal direction, may define a unit pixel that displays a combination of colors.

J (j is a natural number) pixels (hereinafter referred to as "$n^{th}$ horizontal line pixels") disposed along an $n^{th}$ horizontal line, where n is a natural number in a range from 1 to i (e.g., first to $i^{th}$ horizontal lines HL1 to HLi), may be connected to $1^{th}$ to $j^{th}$ data lines (DL1 to DLj), respectively. The $n^{th}$ horizontal line pixels may be connected to an $n^{th}$ gate line. Accordingly, the $n^{th}$ horizontal line pixels may receive an $n^{th}$ gate signal. That is, the j pixels disposed on the same horizontal line may be all supplied with the same gate signal, but pixels on different horizontal lines may be supplied with different gate signals. In an exemplary embodiment, red and green pixels R and G disposed on a first horizontal line HL1 may be all supplied with a first gate signal, and red and green pixels R and G disposed on a second horizontal line HL2 may be supplied with a second gate signal at a different timing from the first gate signal.

As illustrated in FIG. 2, each pixel may include a thin film transistor ("TFT"), a liquid crystal capacitor $C_{LC}$, and a storage capacitor $C_{st}$.

The TFT may be turned on in response to gate signals transmitted through gate lines. The TFT that is turned on may provide the liquid crystal capacitor $C_{LC}$ and the storage capacitor $C_{st}$ with analog image data signals transmitted through data lines.

The liquid crystal capacitor $C_{LC}$ may include a pixel electrode and a common electrode that oppose each other.

The storage capacitor $C_{st}$ may include a pixel electrode and a counter electrode (opposite electrode) that oppose each other. The counter electrode (opposite electrode) may be a previous gate line or a common line that transmits common voltage.

In an exemplary embodiment of a display device, as illustrated in FIG. 1, data driver integrated circuits 222 may be disposed (e.g., mounted) on data carrier tapes 211, respectively.

The data carrier tapes 211 may be in the form of a film.

The data carrier tapes 211, on which the data driver integrated circuits 222 are mounted, may also be referred to as a data tape carrier package.

The data carrier tapes 211 may be configured to electrically connect a printed circuit board ("PCB") 401 to the display panel DP. In an exemplary embodiment, input terminals of the data carrier tapes 211 may be connected to signal wire patterns (not shown) on the PCB 401 and output terminals of the data carrier tapes 211 may be connected to data pad units (not shown) in the non-display area A2 of the display panel DP.

The data pad units may be coupled (or connected) to the data lines (DL1 to DLj) through data link lines.

One side of the data carrier tapes 211, on which the input terminals are disposed, may be bonded to the PCB 401 by anisotropic conductive adhesive film (not shown). The opposite side of the data carrier tapes 211, on which the output terminals are disposed, may be bonded to the display panel DP by the anisotropic conductive adhesive film.

The data carrier tapes 211 may include a flexible material that is bendable. In one exemplary embodiment, for example, the data carrier tapes 211 may include polyimide having high coefficient of thermal expansion ("CTE") or high durability, but not being limited thereto. In an alternative exemplary embodiment, the data carrier tapes 211 may include synthetic resins such as acrylic, polyether nitrile, polyethersulfone, polyethylene terephthalate, polyethylene naphthalate or a combination thereof.

The data pad units may be disposed adjacent to an upper edge portion of the display area A1, in the non-display area A2.

The output terminals of the data carrier tapes 211 may be disposed adjacent to an upper edge portion of the display area A1, in the non-display area A2.

Some of the signal wire patterns may transmit digital image data signals and data control signals from a timing controller to the data driver integrated circuits 222. In such an embodiment, the data driver integrated circuits 222 may receive the digital image data signals and data control signals through input wire patterns (not shown) on the data carrier tapes 211. The data driver integrated circuits 222 may output analog image data signals through output wire patterns on the data carrier tapes 211. In such an embodiment, an end portion of each input wire pattern may correspond to the input terminal and an end portion of each output wire pattern may correspond to the output terminal.

Some other signal wire patterns may transmit gate control signals to gate driver integrated circuits 333 through auxiliary wire patterns (not shown) on any one data carrier tape 211 and first auxiliary lines (not shown) on an edge portion (e.g., a corner) of the lower substrate 361a. The auxiliary wire patterns may be disposed on an outermost data carrier tape 211 of all the data carrier tapes 211. In an exemplary embodiment, as illustrated in FIG. 1, the auxiliary wire patterns may be disposed on one data carrier tape 211 that is on the leftmost side.

In an exemplary embodiment of a display device, the timing controller and a power supply unit may be disposed on the PCB 401.

As illustrated in FIG. 1, the gate driver integrated circuits 333 may be disposed or mounted on gate carrier tapes 311, respectively.

The gate carrier tapes 311 may be in the form of a film.

The gate carrier tapes 311, on which the gate driver integrated circuits 333 are mounted, may also be referred to as a gate tape carrier package.

The gate driver integrated circuits 333 may generate gate signals according to the gate control signals. The gate signals output from the gate driver integrated circuits 333 may be sequentially supplied to the gate lines (GL1 to GLi).

Input terminals of the gate carrier tapes 311 may be connected to second auxiliary lines (not shown). In an exemplary embodiment, the second auxiliary lines may be disposed in the non-display area A2 of the lower substrate 361a. In such an embodiment, the second auxiliary lines may be disposed between the gate carrier tapes 311 that are adjacent to each other.

The gate control signals supplied from the timing controller through the auxiliary wire patterns and the first auxiliary lines may be supplied to the respective gate carrier tapes 311 through the second auxiliary lines. The gate driver integrated circuit 333 may be supplied with the gate control signals through the input terminals on the gate carrier tapes 311.

Output terminals of the gate carrier tapes 311 may be connected to gate pad units (not shown) in the non-display area A2 of the display panel DP.

The gate pad units may be connected to the gate lines (GL1 to GLi) through gate link lines (not shown).

One side of the gate carrier tapes 311, on which the output terminals are disposed, may be bonded to the display panel DP by anisotropic conductive adhesive film.

The gate carrier tapes 311 may include a flexible material that is bendable. In one exemplary embodiment, for example, the gate carrier tapes 311 may include polyimide having high CTE or high durability. In an alternative exemplary embodiment, the gate carrier tapes 311 may include synthetic resins such as acrylic, polyether nitrile, polyethersulfone, polyethylene terephthalate, polyethylene naphthalate or a combination thereof.

The gate pad units may be disposed adjacent to a left edge portion of the display area A1, in the non-display area A2.

The output terminals of the gate carrier tapes 311 may be disposed adjacent to a left edge portion of the display area A1, in the non-display area A2.

In an exemplary embodiment of a display device, as illustrated in FIG. 3, a lower polarizer 501a may be disposed on the rear of the lower substrate 361a, and an upper polarizer 501b may be disposed on the rear of the upper substrate 361b.

The respective lower and upper polarizers 501a and 501b may have a plurality of surfaces. For ease of description, the plurality of surfaces are defined as the following terms. Respective surfaces that face each other with the liquid crystal layer 555 and the two substrates interposed therebetween are defined as front surfaces of the corresponding polarizers, surfaces opposite the front surfaces are defined as rear surfaces of the corresponding polarizers, and surfaces that are between edges (or corners) of the front and rear surfaces of the corresponding polarizers are defined as side surfaces.

Referring to FIG. 3, the upper polarizer 501b may have a smaller size (e.g., area) than the upper substrate 361b.

Referring to FIG. 3, one side 881 of the lower polarizer 501a may intersect (or cross) an imaginary (planar) surface 801 extends from the side surface of the lower substrate 361a (or the upper substrate 361b). Therefore, the one side 881 of the lower polarizer 501a may not be in contact with (e.g., not covered by) the rear surface of the lower substrate 361a. In such an embodiment, the one side 881 of the lower polarizer 501a may protrude out further than the side surface of the lower substrate 361a. Hereinafter, the one side 881 of the lower polarizer 501a will be referred to as a first lower protrusion 881 for ease of description.

In such an embodiment, referring to FIG. 3, the opposite side 882 of the lower polarizer 501a may intersect (or cross) an imaginary (planar) surface 802 extends from the side surface of the lower substrate 361a toward the lower polarizer 501a. Therefore, the opposite side 882 of the lower polarizer 501a may not be in contact with (e.g., not covered by) the rear surface of the lower substrate 361a. In such an embodiment, the opposite side 882 of the lower polarizer 501a may protrude out further than the side surface of the lower substrate 361a. Hereinafter, the opposite side 882 of the lower polarizer 501a will be referred to as a second lower protrusion 882 for ease of description.

In an exemplary embodiment, the lower polarizer 501a may have a larger or smaller size (e.g., area) than the lower substrate 361a. In an alternative exemplary embodiment, the area of the lower polarizer 501a may also be substantially the same as an area of the lower substrate 361a. Herein, an area of a substrate means the area of a surface (e.g., the largest surface) of the substrate.

In an exemplary embodiment of a display device, a light shielding sealant 685 may be disposed on at least one of a plurality of side surfaces of the two substrates 361a and 361b. In an exemplary embodiment, as illustrated in FIG. 3, the light shielding sealant 685 may be applied to (e.g., in contact with) a first side surface (e.g., a side surface on the right side of FIG. 3) of the lower substrate 361a, a second side surface (e.g., a side surface on the left side of FIG. 3) of the lower substrate 361a, and a first side surface (e.g., a side surface on the right side of FIG. 3) of the upper substrate 361b.

In an exemplary embodiment, a process of providing the light shielding sealant 685 may be performed after the lower and upper polarizers 501a and 501b are bonded to the display panel DP, but the invention is not limited thereto. In an alternative exemplary embodiment, the process of providing of the light shielding sealant 685 may be performed in different points of time.

In an exemplary embodiment, the light shielding sealant 685 may be disposed on all of the side surfaces of the upper substrate 361b and all of the side surfaces of the lower substrate 361a.

In an exemplary embodiment, as shown in FIG. 3, the light shielding sealant 685 applied to the first side surface of the lower substrate 361a and the first side surface of the upper substrate 361b may be partially applied to front and side surfaces of the first lower protrusion 881. In an exemplary embodiment, the light shielding sealant 685 applied to the first side surface of the lower substrate 361a and the first side surface of the upper substrate 361b may have a substantially or relatively uniform thickness owing to the first lower protrusion 881. In such an embodiment, a difference in thickness may decrease between a central portion of the light shielding sealant 685 and a lower side thereof. In such an embodiment, a lower edge portion of the light shielding sealant 685 may be effectively supported by the first lower protrusion 881 during an application process thereof such that the thickness of the lower edge portion becomes larger. Therefore, in such an embodiment, light leakage from the lower edge portion may be minimized.

In an exemplary embodiment, as shown in FIG. 3, the light shielding sealant 685 applied to the second side surface of the lower substrate 361a may be partially applied to front and side surfaces of the second lower protrusion 882. In such an embodiment, the second lower protrusion 882 may allow the light shielding sealant 685 applied to the second side surface of the lower substrate 361a to have a substantially or relatively uniform thickness. In such an embodiment, a difference in thickness may decrease between a central portion of the light shielding sealant 685 and a lower side thereof. In such an embodiment, a lower edge portion of the light shielding sealant 685 may be effectively supported by the second lower protrusion 882 during an application process thereof such that the thickness of the lower edge portion becomes. Therefore, in such an embodiment, light leakage from the lower edge portion may be minimized.

Figure 4:
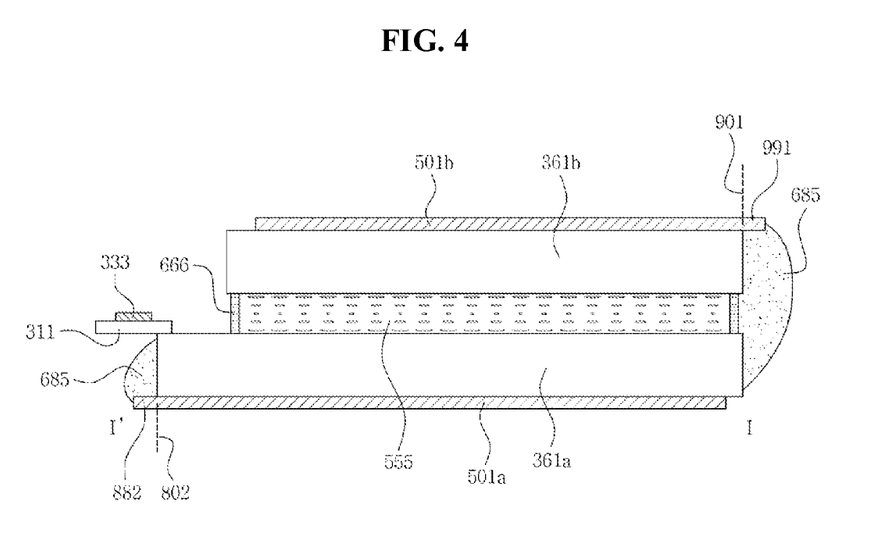
FIG. 4 is a cross-sectional view taken along line I-I' of FIG. 1 showing an alternative exemplary embodiment of the display device shown in FIG. 1.

FIG. 4 is a cross-sectional view taken along line I-I' of FIG. 1 showing an alternative exemplary embodiment of the display device shown in FIG. 1.

Referring to FIG. 4, in an exemplary embodiment, one side 991 of the upper polarizer 501b may protrude or extend to intersect (or cross) an imaginary (planar) surface 901 that extends toward the upper polarizer 501b from the side surface of the upper substrate 361b. Therefore, the one side 991 of the upper polarizer 501b may not be in contact with (e.g., not covered by) the rear surface of the upper substrate 361b. In such an embodiment, the one side 991 of the upper polarizer 501b may protrude out further than the side surface of the upper substrate 361b. Hereinafter, the one side 991 of the upper polarizer 501b will be referred to as a first upper protrusion 991 for ease of description.

The upper polarizer 501b may have a larger or smaller size (e.g., area) than the upper substrate 361b. The area of the upper polarizer 501b may be substantially the same as the area of the upper substrate 361b.

Referring to FIG. 4, the lower polarizer 501a may include the second lower protrusion 882.

The lower polarizer 501a may have a larger or smaller size (e.g., area) than the lower substrate 361a. The area of the lower polarizer 501a may be substantially the same as the area of the lower substrate 361a.

The light shielding sealant 685 may be disposed on at least one of a plurality of side surfaces of the two substrates 361a and 361b. In an exemplary embodiment, as illustrated in FIG. 4, the light shielding sealant 685 may be applied to a first side surface (a side surface on the right side of FIG. 4) of the lower substrate 361a, a second side surface (a side surface on the left side of FIG. 4) of the lower substrate 361a, and a first side surface (a side surface on the right side of FIG. 4) of the upper substrate 361b.

The process of providing (e.g., applying) the light shielding sealant 685 may be performed after the lower and upper polarizers 501a and 501b are bonded to the display panel DP, but the invention is not limited thereto. The application of the light shielding sealant 685 may be performed in different points of time.

The light shielding sealant 685 may be disposed on all of the side surfaces of the upper substrate 361b and all of the side surfaces of the lower substrate 361a.

In an exemplary embodiment, the light shielding sealant 685 applied to the first side surface of the lower substrate 361a and the first side surface of the upper substrate 361b may be partially applied to front and side surfaces of the first upper protrusion 991. In such an embodiment, the first upper protrusion 991 may allow the light shielding sealant 685 applied to the first side surface of the lower substrate 361a and the first side surface of the upper substrate 361b to have a substantially or relatively uniform thickness. In such an embodiment, a difference in thickness may decrease between a central portion of the light shielding sealant 685 and an upper side thereof. In such an embodiment, an upper edge portion of the light shielding sealant 685 may be effectively supported by the first upper protrusion 991 during an application process thereof such that the thickness of the upper edge portion becomes larger. Therefore, light leakage from the upper edge portion may be minimized.

In an exemplary embodiment, the light shielding sealant 685 applied to the second side surface of the lower substrate 361a may be partially applied to (or covers) at least one of front and side surfaces of the second lower protrusion 882 corresponding thereto. In such an embodiment, the second lower protrusion 882 may allow the light shielding sealant 685 applied to the second side surface of the lower substrate 361a to have a substantially or relatively uniform thickness. In such an embodiment, a difference in thickness may decrease between a central portion of the light shielding sealant 685 and a lower side thereof. In such an embodiment, a lower edge portion of the light shielding sealant 685 may be effectively supported by the second lower protrusion 882 during an application process thereof such that the thickness of the lower edge portion becomes larger. Therefore, in such an embodiment, light leakage from the lower edge portion may be minimized.

Figure 5:
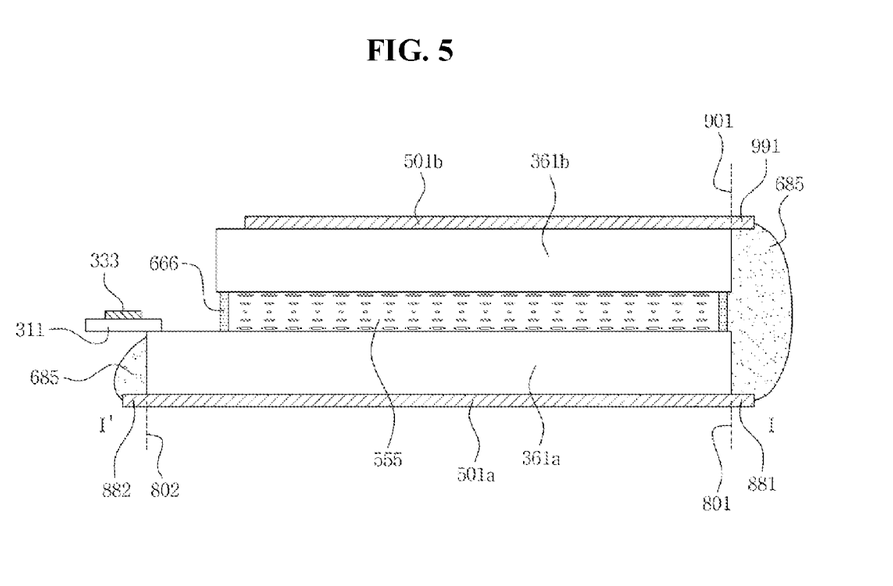
FIG. 5 is a cross-sectional view taken along line I-I' of FIG. 1 showing another alternative exemplary embodiment of the display device shown in FIG. 1.

FIG. 5 is a cross-sectional view taken along line I-I' of FIG. 1 showing another alternative exemplary embodiment of the display device shown in FIG. 1.

Referring to FIG. 5, in an exemplary embodiment, the upper polarizer 501b may include the first upper protrusion 991, and the lower polarizer 501a may include the first and second lower protrusions 881 and 882.

The upper polarizer 501b may have a larger or smaller size (e.g., area) than the upper substrate 361b. The area of the upper polarizer 501b may be substantially the same as the area of the upper substrate 361b.

The lower polarizer 501a may have a larger or smaller size (e.g., area) than the lower substrate 361a. The area of the lower polarizer 501a may be substantially the same as the area of the lower substrate 361a.

The light shielding sealant 685 may be disposed on at least one of a plurality of side surfaces of the two substrates 361a and 361b. In an exemplary embodiment, as illustrated in FIG. 5, the light shielding sealant 685 may be applied to a first side surface (a side surface on the right side of FIG. 5) of the lower substrate 361a, a second side surface (a side surface on the left side of FIG. 5) of the lower substrate 361a, and a first side surface (a side surface on the right side of FIG. 5) of the upper substrate 361b.

The process of applying the light shielding sealant 685 may be performed after the lower and upper polarizers 501a and 501b are bonded to the display panel DP, but the invention is not limited thereto. The application of the light shielding sealant 685 may be performed in different points of time.

The light shielding sealant 685 may be disposed on all of the side surfaces of the upper substrate 361b and all of the side surfaces of the lower substrate 361a.

In an exemplary embodiment, the light shielding sealant 685 applied to the first side surface of the lower substrate 361a and the first side surface of the upper substrate 361b may be partially applied to front and side surfaces of the first lower protrusion 881 and the first upper protrusion 991. In such an embodiment, the first lower protrusion 881 and the first upper protrusion 991 may allow the light shielding sealant 685 applied to the first side surface of the lower substrate 361a and the first side surface of the upper substrate 361b to have a substantially or relatively uniform thickness. In such an embodiment, a difference in thickness may decrease between a central portion of the light shielding sealant 685 and upper and lower sides thereof. In such an embodiment, a lower edge portion of the light shielding sealant 685 may be effectively supported by the first lower protrusion 881 and an upper edge portion of the light shielding sealant 685 may also be effectively supported by the first upper protrusion 991 during an application process thereof such that the thickness of the lower and upper edge portions becomes larger. Therefore, in such an embodiment, light leakage from the lower and upper edge portions may be minimized.

In an exemplary embodiment, the light shielding sealant 685 applied to the second side surface of the lower substrate 361a may be partially applied to front and side surfaces of the second lower protrusion 882. In such an embodiment, the second lower protrusion 882 may allow the light shielding sealant 685 applied to the second side surface of the lower substrate 361a to have a substantially or relatively uniform thickness. In such an embodiment, a difference in thickness may decrease between a central portion of the light shielding sealant 685 and a lower side thereof. In such an embodiment, a lower edge portion of the light shielding sealant 685 may be effectively supported by the second lower protrusion 882 during an application process thereof such that the thickness of the lower edge portion becomes larger. Therefore, in such an embodiment, light leakage from the lower edge portion may be minimized.

In an exemplary embodiment, end portions of the first lower and upper protrusions 881 and 991 may be disposed on a same (planar) surface. In such an embodiment, distances of the end portions of the first lower and upper protrusions 881 and 991 from the imaginary (planar) surfaces 801 and 901 may be substantially the same as each other.

Figure 6:
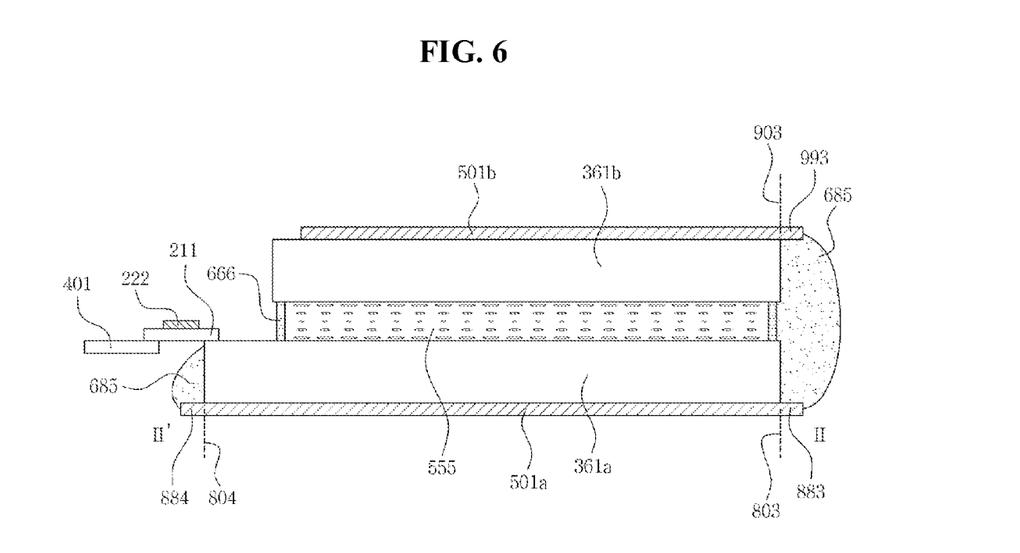
FIG. 6 is a cross-sectional view taken along line II-II' of FIG. 1.

FIG. 6 is a cross-sectional view taken along line II-II' of FIG. 1.

In an exemplary embodiment, one side 883 of the lower polarizer 501*a* may intersect (or cross) an imaginary (planar) surface 803 extends from the side surface of the lower substrate 361*a* (or the upper substrate 361*b*) to the lower polarizer 501*a*. Therefore, the one side 883 of the lower polarizer 501*a* may not be in contact with the rear of the lower substrate 361*a*. In such an embodiment, the one side 883 of the lower polarizer 501*a* may protrude out further than the side surface of the lower substrate 361*a*. Hereinafter, the one side 883 of the lower polarizer 501*a* will be referred to as a third lower protrusion 883 for ease of description.

In an exemplary embodiment, referring to FIG. 6, the opposite side 884 of the lower polarizer 501*a* may intersect (or cross) an imaginary (planar) surface 804 extends from the side surface of the lower substrate 361*a* to the lower polarizer 501*a*. Therefore, the opposite side 884 of the lower polarizer 501*a* may not be in contact with the rear of the lower substrate 361*a*. In such an embodiment, the opposite side 884 of the lower polarizer 501*a* may protrude out further than the side surface of the lower substrate 361*a*. Hereinafter, the opposite side 884 of the lower polarizer 501*a* will be referred to as a fourth lower protrusion 884 for ease of description.

The lower polarizer 501*a* may have a larger or smaller size (e.g., area) than the lower substrate 361*a*. The area of the lower polarizer 501*a* may be substantially the same as area of the lower substrate 361*a*.

Referring to FIG. 6, one side 993 of the upper polarizer 501*b* may intersect (or cross) an imaginary (planar) surface 903 extends from the side surface of the upper substrate 361*b* to the upper polarizer 501*b*. Therefore, the one side 993 of the upper polarizer 501*b* may not be in contact with (e.g., not covered by) the rear of the upper substrate 361*b*. In such an embodiment, the one side 993 of the upper polarizer 501*b* may protrude out further than the side surface of the upper substrate 361*b*. Hereinafter, the one side 993 of the upper polarizer 501*b* will be referred to as a second upper protrusion 993 for ease of description.

The upper polarizer 501*b* may have a larger or smaller size (e.g., area) than the upper substrate 361*b*. The area of the upper polarizer 501*b* may be substantially the same as the area of the upper substrate 361*b*.

The light shielding sealant 685 may be disposed on at least one of a plurality of side surfaces of the two substrates 361*a* and 361*b*. In an exemplary embodiment, as illustrated in FIG. 6, the light shielding sealant 685 may be applied to a third side surface (a side surface on the right side of FIG. 6) of the lower substrate 361*a*, a fourth side surface (a side surface on the left side of FIG. 6) of the lower substrate 361*a*, and a third side surface (a side surface on the right side of FIG. 6) of the upper substrate 361*b*.

The process of applying the light shielding sealant 685 may be performed after the lower and upper polarizers 501*a* and 501*b* are bonded to the display panel DP, but the invention is not limited thereto. The application of the light shielding sealant 685 may be performed in different points of time.

The light shielding sealant 685 may be disposed on all of the side surfaces of the upper substrate 361*b* and all of the side surfaces of the lower substrate 361*a*.

In an exemplary embodiment, the light shielding sealant 685 applied to the third side surface of the lower substrate 361*a* and the third side surface of the upper substrate 361*b* may be partially applied to front and side surfaces of the third lower protrusion 883 and the second upper protrusion 993. In such an embodiment, the third lower protrusion 883 and the second upper protrusion 993 may allow the light shielding sealant 685 applied to the third side surface of the lower substrate 361*a* and the third side surface of the upper substrate 361*b* to have a substantially or relatively uniform thickness. In such an embodiment, a difference in thickness may decrease between a central portion of the light shielding sealant 685 and lower and upper sides thereof. In such an embodiment, a lower edge portion of the light shielding sealant 685 may be effectively supported by the third lower protrusion 883 and an upper edge portion of the light shielding sealant 685 may be effectively supported by the second upper protrusion 993 during an application process thereof such that the thickness of the lower and upper edge portions becomes larger. Therefore, light leakage from the lower and upper edge portions may be minimized.

In an exemplary embodiment, the light shielding sealant 685 applied to the fourth side surface of the lower substrate 361*a* may be partially applied to front and side surfaces of the fourth lower protrusion 884. In such an embodiment, the fourth lower protrusion 884 may allow the light shielding sealant 685 applied to the fourth side surface of the lower substrate 361*a* to have a substantially or relatively uniform thickness. In such an embodiment, a difference in thickness may decrease between a central portion of the light shielding sealant 685 and a lower side thereof. In such an embodiment, a lower edge portion of the light shielding sealant 685 may be effectively supported by the fourth lower protrusion 884 during an application process thereof such that the thickness of the lower edge portion becomes larger. Therefore, light leakage from the lower edge portion may be minimized.

End portions of the second upper protrusion 993 and the third lower protrusion 883 in a same side may be disposed on the same surface.

In such an embodiment, although not illustrated, the cross-sectional view taken along line II-II' of an exemplary embodiment of FIG. 1 may have a structure corresponding to the configuration illustrated in FIG. 3 or 4.

The first lower protrusion 881, the second lower protrusion 882, the first upper protrusion 991, the second upper protrusion 993, the third lower protrusion 883 and the fourth lower protrusion 884 may have substantially the same length as each other, or may have different lengths from each other.

The respective first lower protrusion 881, the second lower protrusion 882, the first upper protrusion 991, the second upper protrusion 993, the third lower protrusion 883 and the fourth lower protrusion 884 may have a height in a range of about 1 micrometer (µm) to about 500 µm with respect to a side surface of the lower substrate 361*a* or the upper substrate 361*b*, and such a height may be determined based on a shielding ratio of the light shielding sealant 685. Herein, the height of the first lower protrusion 881, the second lower protrusion 882, the first upper protrusion 991, the second upper protrusion 993, the third lower protrusion 883 or the fourth lower protrusion 884 may be referred to as a distance of a side surface thereof from a corresponding side surface of the lower substrate 361*a* or the upper substrate 361*b*. The shielding ratio of the light shielding sealant 685 may vary depending on a material used as the light shielding sealant 685.

Figure 7:
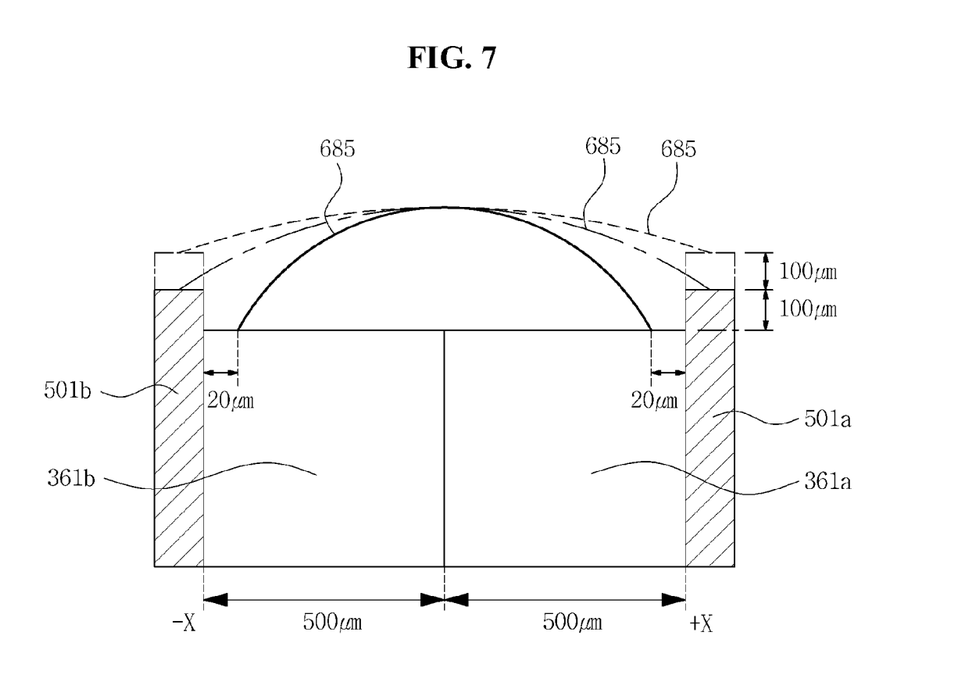
FIGS. 7 to 9 are diagrams illustrating a correlation between a length of a protrusion and transmittance of light through side surfaces of two substrates.
Figure 8:
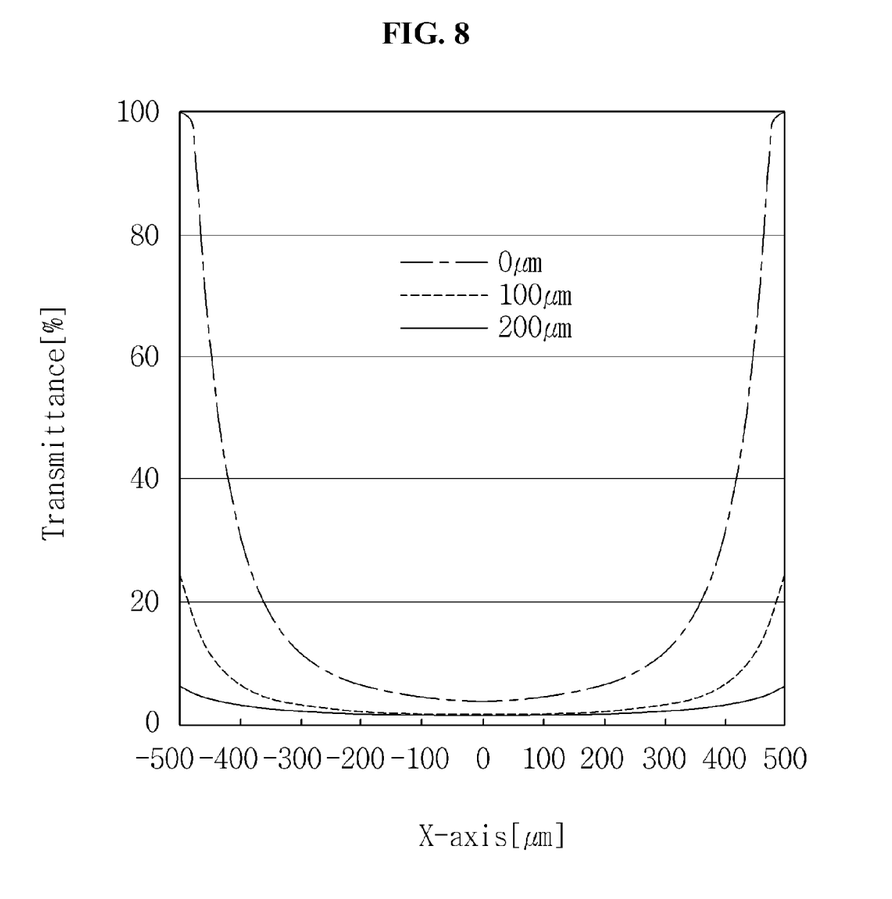
Figure 9:
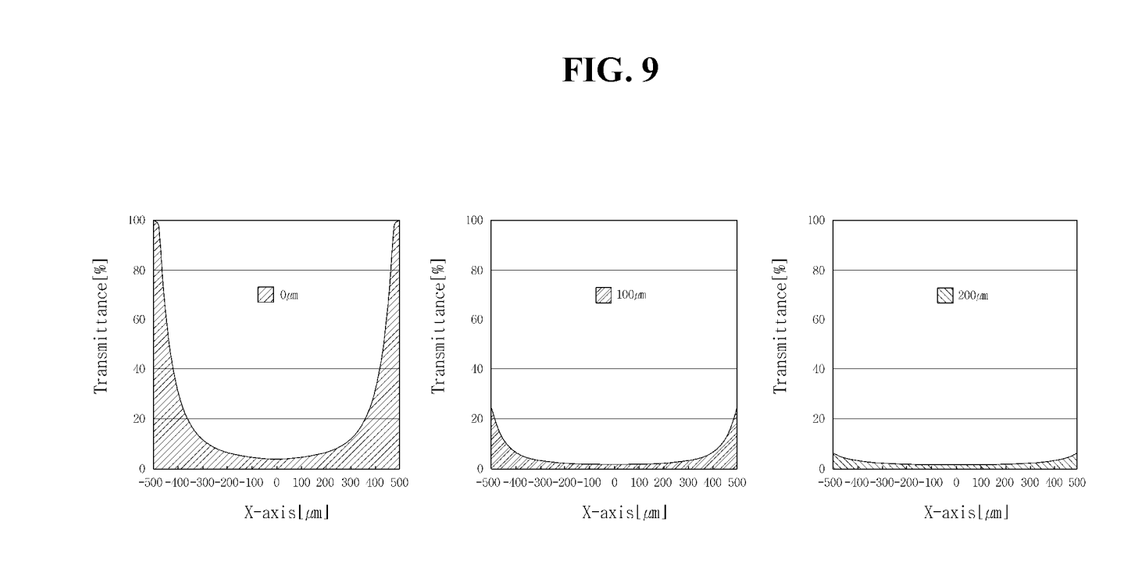

FIGS. 7 to 9 are diagrams illustrating a correlation between lengths of the protrusions and transmittance of light through the side surfaces of the two substrates. In FIG. 9, a portion indicated by diagonal lines may be a region through which light is transmitted, namely a region from which light leaks.

Components between the lower and upper substrates 361a and 361b are omitted from FIG. 7 for convenience of illustration.

As illustrated in FIGS. 7 to 9, in a conventional display device including polarizers having no protrusion, there may be a large difference in transmittance between a central portion of the side surface and two edge portions thereof. However, in an exemplary embodiment, the polarizer includes the protrusion having a length of about 100 μm or about 200 μm, the difference in transmittance between a central portion of the side surface and two edge portions thereof may be substantially reduced.

In a conventional display device, as illustrated in FIG. 7, the light shielding sealant 685 is typically provided with a margin area of about 20 μm to prevent the light shielding sealant 685 from overflowing into the rear of the substrates during the application of the light shielding sealant 685. In an exemplary embodiment of a display device according to the invention, the protrusion of a polarizer (e.g., the first lower protrusion 881, the second lower protrusion 882, the first upper protrusion 991, the second upper protrusion 993, the third lower protrusion 883 or the fourth lower protrusion 884) may allow the overflow of the light shielding sealant 685 utilizing the protrusions to be reduced such that the light shielding sealant 685 may be effectively provided without providing the margin area for an application process thereof for the conventional display device.

From the foregoing, it will be appreciated that various exemplary embodiments of the invention have been described herein for purposes of illustration, and that various modifications may be made without departing from the scope and spirit of the disclosure. Accordingly, the various exemplary embodiments disclosed herein are not intended to limit the scope of the invention, and the true scope and spirit of the invention is indicated by the following claims, and equivalents thereof.

What is claimed is:

1. A display device comprising:
   a first substrate having a display area and a non-display area;
   a second substrate opposite the first substrate;
   a first polarizer on a surface of at least one of the first and second substrates;
   a second polarizer on another surface of the first and second substrates; and
   a light shielding sealant on a side surface of the at least one of the first and second substrates on which the first polarizer is disposed,
   wherein
   a plane of the side surface of the at least one of the first and second substrates on which the light shielding sealant is disposed defines an imaginary surface,
   the first polarizer extends along the surface of the at least one of the first and second substrates to intersect the imaginary surface, and
   the second polarizer extends along the another surface of the first and second substrates to intersect the imaginary surface.

2. The display device of claim 1, wherein the light shielding sealant is in contact with at least one of a side surface and a lower surface of the first polarizer.

3. The display device of claim 1, wherein a distance between an end portion of the first polarizer and the side surface is in a range of about 1 micrometer to about 500 micrometers.

4. The display device of claim 1, wherein the light shielding sealant is in contact with at least one of a side surface and a lower surface of the second polarizer.

5. The display device of claim 1, wherein a distance between an end portion of the second polarizer and the side surface is in a range of about 1 micrometer to about 500 micrometers.

6. The display device of claim 5, wherein
   the end portions of the first and second polarizers are disposed on the same surface.

7. A display device comprising:
   a first substrate having a display area and a non-display area;
   a second substrate opposite the first substrate;
   each one of the first and second substrates including a front surface which faces the other one of the first and second substrates, a rear surface opposite to the front surface and side surfaces which connect the front and rear surfaces to each other;
   a first polarizer on the rear surface of one of the first and second substrates, an end portion of the first polarizer extending further than a side surface of the one of the first and second substrates;
   a second polarizer on the rear surface of the other one of the first and second substrates; and
   a light shielding sealant on the side surface of the one of the first and second substrates from which the first polarizer further extends, the light shielding sealant extending to contact the end portion of the first polarizer,
   wherein
   the end portion of the first polarizer further extends from a first side surface of the one of the first and second substrates,
   an end portion of the second polarizer extends further than the first side surface of the one of the first and second substrates, and
   the light shielding sealant is disposed on the first side surface of the one of the first and second substrates and extends to contact the end portion of the second polarizer.

8. The display device of claim 7, wherein
   the other one of the first and second substrates includes a first side surface corresponding to the first side surface of the one of the first and second substrates, and
   the light shielding sealant disposed on the first side surface of the one of the first and second substrates, extends to contact the end portion of the first polarizer and to contact the first side surface of the other one of the first and second substrates.

9. The display device of claim 7, wherein the first polarizer extends further from the side surface of the one of the first and second substrates by a distance in a range of about 1 micrometer to about 500 micrometers.

10. The display device of claim 7, wherein end surfaces of the end portions of the first and second polarizers are in a same plane as each other.

11. The display device of claim 7, wherein
    the end portion of the first polarizer defines an end surface of the first polarizer, and
    the light shielding sealant extending to contact the end portion of the second polarizer contacts the end surface of the first polarizer.

12. A display device comprising:

a first substrate having a display area and a non-display area;

a second substrate opposite the first substrate;

each one of the first and second substrates including a front surface which faces the other one of the first and second substrates, a rear surface opposite to the front surface and side surfaces which connect the front and rear surfaces to each other;

a first polarizer on the rear surface of one of the first and second substrates, an end portion of the first polarizer extending further than a side surface of the one of the first and second substrates;

a second polarizer on the rear surface of the other one of the first and second substrates; and a light shielding sealant on the side surface of the one of the first and second substrates from which the first polarizer further extends, the light shielding sealant extending to contact the end portion of the first polarizer, wherein each of the first and second substrates includes a first side surface at a first side of the display device, and a second side surface at a second side of the display device opposite to the first side thereof, the end portion of the first polarizer further extends from the first side surface of the one of the first and second substrates, an end portion of the second polarizer extends further than the second side surface of the other one of the first and second substrates, and the light shielding sealant is further disposed on the second side surface of the other one of the first and second substrates and extends to contact the end portion of the second polarizer.

* * * * *